No. 616,011. Patented Dec. 13, 1898.
W. I. REICH.
PIPE JOINT.
(Application filed July 7, 1897.)
(No Model.)
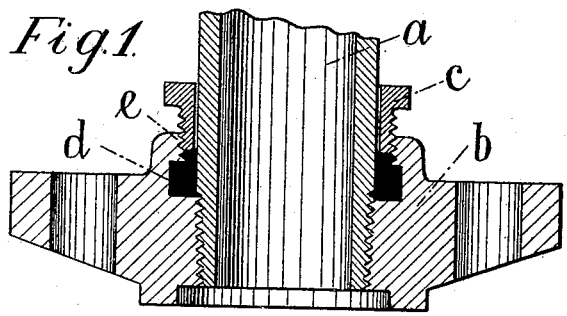
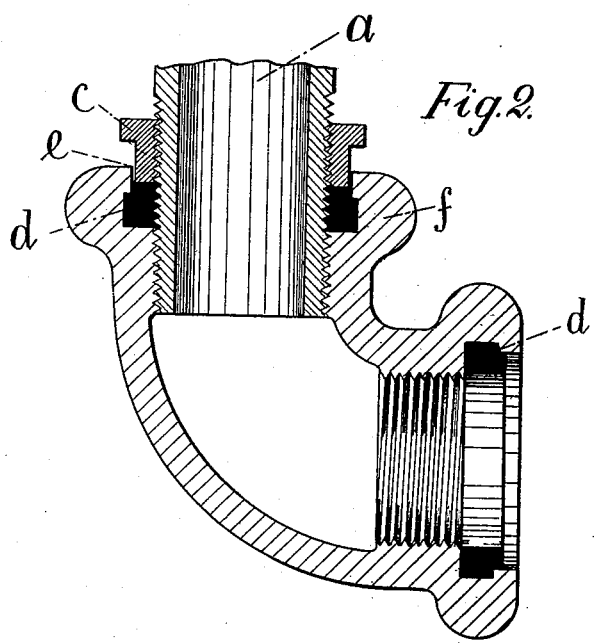
Witnesses
John A. Paulson,
Harry Calhoun
William I. Reich, Inventor
By Schreiter, Van Iderstine & Mathews, his Attorneys.

UNITED STATES PATENT OFFICE.

WILLIAM I. REICH, OF NEW YORK, N. Y.

PIPE-JOINT.

SPECIFICATION forming part of Letters Patent No. 616,011, dated December 13, 1898.

Application filed July 7, 1897. Serial No. 643,712. (No model.)

*To all whom it may concern:*

Be it known that I, WILLIAM I. REICH, a citizen of the United States, and a resident of New York, county and State of New York, have invented certain new and useful Improvements in Pipe-Joints, of which the following is a full, clear, and exact specification, reference being had to the accompanying drawings, wherein—

Figure 1 is a sectional view of my improved joint used in connecting a flange to the end of a pipe; Fig. 2, a sectional view of an elbow joined to the end of the pipe.

My invention relates to conduits; and it consists of the hereinafter-described construction of an absolutely-tight joint between a pipe and a fitting.

For conduits used for conveying of gaseous substances under high pressure—as, for instance, in cooling and refrigerating plants for conduits used in distribution of live steam, compressed air, carbon dioxid, and the like—it is absolutely essential that the joints be not only absolutely tight, (water and gas tight,) but also that their tightness be not affected by expansion and contraction of the conduits produced by changes in temperature.

The expansion and contraction of conduits used for conveying gaseous substances under high pressure and varying temperature are far greater than in any other conduits, the temperature of the conduits changing 100° and more in rapid succession.

The heretofore-used packings for the joints of such conduits, even those of soft metal, are found to be inefficient to prevent leaking of such conduits, because the packing does not expand and contract equally with the metal of the conduit, and consequently the rapid changes from expansion to contraction, and vice versa, loosen the adhesiveness and compactness of the packing, whereupon the metal in the joint is subjected to corrosion, and thereby the utility of the joint is destroyed. This is especially the case in conduits for refrigerating or cooling purposes—namely, those wherein the liquefied gases are conducted under greatly-varying temperature and pressure.

I have ascertained by a series of tests and experiments that not all joints are affected equally and that as a rule the nearer the coefficient of expansion of the packing metal used in a joint approaches that of the metal of which the conduit is constructed and the more such packing metal is compressed in the joint the less is the joint affected by expansion and contraction of the conduits.

Pure metals are not suitable as packings, but metallic alloys can be produced having the same or nearly the same coefficient of expansion as the metal of which the conduit is constructed. I have found that an alloy of about sixty-nine per cent. of lead, twenty-seven per cent. of tin, and four per cent. of antimony possesses almost the same coefficient of expansion as wrought-iron and the same as cast-iron, and an alloy of eighty-one per cent. of lead and of nineteen per cent. of tin the same coefficient of expansion as brass and nearly the same as copper.

Conduits are generally constructed of wrought-iron pipes and cast (malleable-iron) fittings or of brass fittings and copper tubing.

Following my discovery I have constructed the joints shown in the accompanying drawings, using for the packing soft metallic alloy, whose coefficient of expansion is the same, or nearly the same, as that of the metals of which joined parts of the conduit are produced. The packing is fitted in an annular groove $d$ of sufficient capacity, provided in the fitting around the bore into which the pipe is screwed, and a screw-threaded collar $c$, either fitted upon the pipe or in the bore of the fittings, is used to compress it into the groove. Thus in conduits made of wrought-iron pipes and cast-iron fittings I use the alloy composed of sixty-nine per cent. of lead, twenty-seven per cent. of tin, and four per cent. of antimony. In conduits made of copper tubing and brass fittings I use an alloy composed of eighty-one per cent. of lead, nineteen per cent. of tin, &c.

The mechanical construction of my improved pipe-joint is shown in Fig. 1 of the drawings. The pipe $a$ is slightly tapered toward its end and screw-threaded. The bore in flange $b$ is correspondingly screw-threaded, and the connection between the flange and the pipe is made by screwing the flange on the end of the pipe. Above the screw-threaded bore of the flange is provided a groove $d$, and the concentrical wider bore $e$ beyond is also screw-threaded. Into this groove $d$ a ring, cast of the above-described metallic composition, is filled before the pipe $a$ is screwed into the flange $b$. This ring, of about the same inside diameter as the outside diameter of the pipe, may also be produced by casting the metallic alloy into the groove. Before the pipe $a$ is screwed into the flange $b$ a nut $c$ is slid upon it. This nut is also screw-threaded, its screw-thread fitting that of the bore $e$ of the flange. As nut $c$ is screwed into the bore $e$ its lower edge presses upon the metallic ring $d$ and forces this yielding metal tightly upon the pipe $a$ and walls of the groove $d$ and into all crevices between the screw-threads of the pipe $a$ and the flange $b$. The pressure of the nut $c$ will be supplemented by the resistance of the walls of the groove, and this is utilized to reduce the area of friction between the nut $c$ and the packing-ring by making the area of the lower edge of nut $c$ considerably smaller than the area of the packing-ring $d$, the excess of the latter being within the groove $d$. The inside diameter of the nut $c$ is slightly larger than the outside diameter of the pipe $a$ to provide a clearance, permitting the soft metal to yield by filling into this space when excessive pressure applied to it by the screwing of nut $c$, and thus to prevent the breaking of its screw-thread.

In Fig. 2 a somewhat-modified construction of the joint is shown. The end of the pipe is again screw-threaded, and a corresponding screw-thread is cut in the bore of the elbow-fitting $f$. A similar groove $d$ is provided in the elbow-fitting $f$ as in the flange $b$, but the bore above the groove is not screw-threaded and is wider than the outside diameter of the screw-nut $c$, which in this case is screw-threaded inside and moves on the screw-threaded end of the pipe. The clearance between the nut $c$ and the bore $e$ of the fitting $f$ serves for the same purpose as the clearance provided between the screw-nut $c$ and the pipe $a$ in Fig. 1. The joining of the pipe and fitting and the compressing of the packing-ring are done in the same manner as explained above.

I claim as my invention and desire to secure by Letters Patent—

1. A metallic packing for pipe-joint of a soft metallic alloy having the same coefficient of expansion as the metal of which the parts of the pipe-joint are produced.

2. A metallic packing for joints of wrought-iron pipes with cast-iron fittings composed of sixty-nine parts of lead, twenty-seven parts of tin and four parts of antimony.

3. A pipe-coupling, comprising an inwardly-screw-threaded fitting member, a groove surrounding the bore of the fitting, a pipe screw-threaded on its end and adapted to be screwed into the bore, metallic packing having the same coefficient of expansion as the metal of which the parts of the joint are composed, filled in the groove, and a screw-threaded ring set on the pipe and adapted to be screwed upon and to compress the packing.

4. The combination with a pipe screw-threaded on its end and with a fitting provided with a screw-threaded bore and an annular groove surrounding the bore, of a packing-ring of comparatively soft metallic alloy, having the same or approximately the same coefficient of expansion, as the metals of which the parts of the joint are composed, filled in the groove, and a ring set on the pipe and adapted to be screwed upon and to compress the packing.

In witness that I claim the improvements described in the foregoing specification I have signed my name in the presence of two subscribing witnesses.

WILLIAM I. REICH.

Witnesses:
  ROBERT VALENTINE MATHEWS,
  HARRY CALHOUN.